ELECTROLUMINESCENT CELL AND METHOD OF MAKING THE SAME

Filed Nov. 18, 1966

Inventors:
Jerome S. Prener,
Jack D. Kingsley,
by Edward D. Murphy
Their Attorney.

United States Patent Office 3,503,812
Patented Mar. 31, 1970

3,503,812

ELECTROLUMINESCENT CELL AND METHOD OF MAKING THE SAME

Jerome S. Prener and Jack D. Kingsley, Schenectady, N.Y., assignors to General Electric Company, a corporation of New York Continuation-in-part of application Ser. No. 341,702, Jan. 31, 1964. This application Nov. 18, 1966, Ser. No. 595,467
Int. Cl. H01l 3/00; H05b 33/14
U.S. Cl. 148—33 4 Claims

ABSTRACT OF THE DISCLOSURE

A material having semiconducting and electroluminescent properties and a method of preparing such material is described as comprising a crystal of cadmium fluoride containing yttrium in an amount ranging from a small but finite quantity up to the maximum of approximately 10 mole percent. The impure cadmium fluoride crystal is made semiconductive by placing it in an evacuated enclosure with sufficient cadmium metal to saturate the enclosure with cadmium vapor and by heating the crystal to a temperature until the crystal is equilibrated with the vapor. A layer of insulating cadmium fluoride containing a manganese activator produces an electroluminescent device. A process for making the electroluminescent device comprises melting and crystallizing a powder comprising an appropriate mixture of cadmium fluoride and manganese fluoride, placing a powder containing an appropriate mixture of cadmium fluoride and yttrium fluoride on the surface of the resultant crystal, melting the powder and a small portion of the crystal, crystallizing the melt as a continuation of the first crystal and equilibrating the two-layer crystal with saturated cadmium metal vapor at a temperature approximately in the range of 300° C. to 1000° C.

This application is a continuation-in-part of our copending application Ser. No. 341,702, filed Jan. 31, 1964, assigned to the assignee of this invention entitled, Semi-Conductor Material and Method of Making the Same, now U.S. Patent No. 3,305,486.

The present invention relates to a material having semiconducting and electroluminescent properties and to a method of preparing such a material. In particular, this invention is directed to cadmium fluoride containing yttrium as a semiconductor and as an electroluminescent device, and to the preparation thereof.

In recent years, the demand for semiconductor materials has constantly increased. In addition to their basic utilization in diodes and transistors, other properties have been discovered such as that of electroluminescence. Electroluminescence is the conversion of electrical energy into electromagnetic radiation by a solid material. Such materials have been used in a wide variety of application, for example, display panels or night lights. It is desirable that the material emit in the visible region so that the light may be used for general illumination or be directly observed by an operator or by visible light-sensitive instruments such as cameras.

The present invention is therefore directed to a novel semiconductor material which is electroluminescent in the visible region and to the method of making this material.

It is accordingly an object of the present invention to provide a novel semiconductor material.

A further object of the present invention is a provision of a novel electroluminescent material.

A further object is the provision of a semiconductor material having a wide energy gap between its valence band and its conduction band.

Another object of this invention is the provision of a novel electroluminescent material which emits visible light.

An additional object of this invention is to provide a novel semiconductive crystal containing a relatively low atomic weight impurity which imparts semiconductive properties to the crystal.

Finally, it is an object of the present invention to provide a novel method of preparing a material having one or more of the above mentioned properties.

Briefly, in accordance with one form of our invention, we provide a crystal of cadmium fluoride containing a relatively low atomic weight impurity, specifically yttrium, in an amount ranging from a small but finite quantity up to a maximum of approximately 10 mole percent and which is treated so that it is semiconductive, that is, so that it has a conductivity and an electron mobility in the semiconductive range. To make such a semiconductor, our method comprises growing a crystal of cadmium fluoride containing yttrium by melting and crystallizing an appropriate mixture of cadmium fluoride and yttrium fluoride. The crystal is then made semiconductive by placing it in an evacuated enclosure with sufficient cadmium metal to saturate the enclosure with cadmium vapor at the temperature mentioned below and heating the crystal to a temperature approximately in the range of 300° C. to 1000° C. until the crystal is equilibrated with the vapor as indicated when the crystal turns blue. The resultant crystal is semiconductive.

In further accord with our invention, an electroluminescent device is provided which comprises a crystal of cadmium fluoride containing yttrium and made semiconductive and having, as a continuation of the same crystal, a layer of intrinsic or insulating cadmium fluoride containing an activator such as manganese present in an amount effective to produce electroluminescence. The manganese should be present in an amount ranging from approximately 0.01 mole percent to approximately 1 mole percent. Such a crystal may be made in accordance with the present invention by melting and crystallizing a powder comprising an appropriate mixture of cadmium fluoride and manganese fluoride, placing a powder containing an appropriate mixture of cadmium fluoride and yttrium fluoride on the surface of the resultant crystal, melting the powder and a small portion of the crystal, crystallizing the melt as a continuation of the first crystal and equilibrating the two-layer crystal with saturated cadmium metal vapor at a temperature approximately in the range of 300° C. to 1000° C.

The subject matter which we regard as our invention is particularly pointed out and distinctly claimed in the concluding portion of this specification. The invention, however, both as to organization and method of operation, together with further objects and advantages thereof, may best be understood by reference to the following description taken in connection with the accompanying drawings wherein like reference characters refer to like elements and in which:

Figure 1:
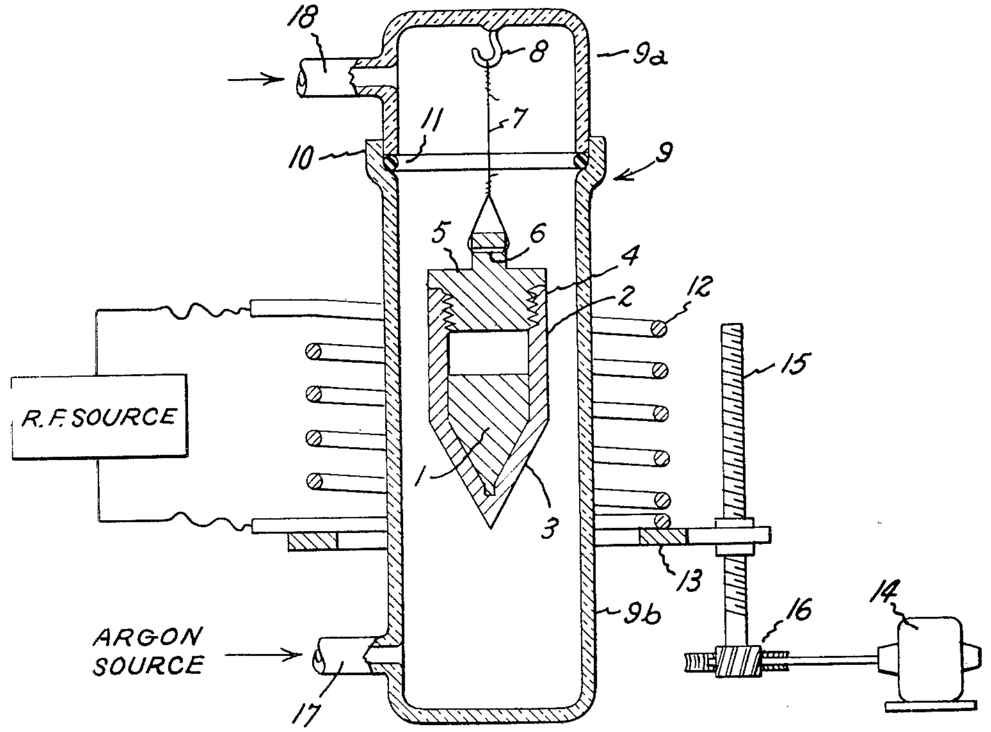
FIGURE 1 is a vertical cross-sectional view of apparatus used in the method of the present invention.

In FIGURE 1 appropriate apparatus for preparing the crystals necessary in the present invention is shown by way of example. A charge of powder 1 comprising a mixture of cadmium fluoride and yttrium fluoride is placed in a crucible 2. The crucible 2 has a conical lower end 3 and a screw-threaded upper end 4 for receiving cap 5. The cap 5 serves to limit evaporation of the fluoride but need not be hermetically sealed to the crucible 2.

The upper portion of cap 5 is apertured as at 6 to receive a wire 7 by means of which the crucible is supported from a hook 8. The hook depends from a quartz tube 9 which comprises upper or cap portion 9A and lower portion 9B, sealed at their junction 10 by means such as an O-ring 11.

The components described above must be non-reactive and sufficiently heat-resistive so as to allow melting of the powder. A minimum temperature of 1075° C. is required although, preferably, a higher value is actually used to insure complete melting. Appropriate materials for such conditions are graphite for the crucible 2 and cap 5, platinum for wire 6 and quartz for hook 8 and tube 9.

The heating means used may comprise a furnace or, as illustrated, an RF heating coil 12 connected to a source of RF energy. The coil may be mounted on a support ring 13 which is adapted to be driven upwardly by the motor 14 through screw 15 and worm 16. Alternatively, the tube 9 may be similarly moved or provision may be made for moving the crucible 2 within tube 9. It is only necessary to provide relative motion between the crucible and the coil so that the crucible may be slowly lowered through the heating zone.

Inlet 17 and outlet 18 are provided for the circulation of an inert gas such as argon through the tube 9. Alternatively, a static inert atmosphere may be provided.

To grow the crystal, a powder comprising cadmium fluoride and yttrium fluoride in an amount to provide an yttrium concentration in the crystal ranging from a small but finite quantity up to approximately 10 mole percent is placed in the crucible. In excess of 10 mole percent, the yttrium concentration is too great and undesired compositions appear. Yttrium concentrations in excess of 1 mole percent are less desirable because nonuniformity may occur in the crystals. This may be due to precipitation of cadmium. The preferred range is therefore up to 1 mole percent.

The powder is heated to a temperature above the melting point of cadmium fluoride, that is, above 1075° C. The crucible is then removed from the furnace or coil at a rate of approximately 1 to 2 centimeters per hour, the closed conical tip being removed first so that a single crystal of cadmium fluoride is grown and the yttrium is co-crystallized therein. The resultant crystal is colorless and is an insulator having a resistivity at room temperature of approximately $10^8$ ohm-centimeters.

To make the crystal semiconductive in accord with the present invention, the crystal is removed from the crucible and, if necessary, cleaned by etching in concentrated HCl, washing in distilled water and dried. The crystal is then placed in an enclosure with sufficient cadmium metal to provide a saturated cadmium atmosphere at the baking temperature. The crystal and cadmium are heated to a temperature approximately in the range of 300° C. to 1000° C. for a time sufficient to equilibrate the crystal with the vapor. This is indicated when the crystal becomes uniformly colored blue. At 500° C., this time may be approximately 3 minutes for a crystal having a smallest diameter of about 1 cm. The crystal resulting from this further step has been found to be an n-type semiconductor and to have a resistivity ranging between 0.1 and 10 ohm-centimeters, a Hall mobility ranging between 1 and 20 centimeters/second per volt/cm. (cm.$^2$/volt sec.) and a carrier concentration ranging between $10^{16}$ and $10^{20}$ electrons per cubic centimeter. The best results have been obtained with an yttrium concentration of 0.1 mole percent.

Although it is not intended to limit either the disclosure or the claims of the present application to a theoretical mechanism for these findings, it is presently believed that the trivalent yttrium ions are located at sites in the cadmium fluoride crystal normally occupied by bivalent cadmium and that fluoride ions are only loosely bound at the interstitial sites. When the crystal is heated in cadmium vapor, these interstitial fluoride ions diffuse to the surface where cadmium fluoride is formed. Electrons from the cadmium diffuse into the crystal and substitute for the charge of the fluoride ions. However, these electrons are very loosely bound and therefore are able to act as conduction electrons, thus giving the crystal its semiconductive properties. It is again noted that this theory is intended only as a suggested explanation and that the present invention is predicated upon the measurable phenomena rather than upon this theory.

Figure 2:
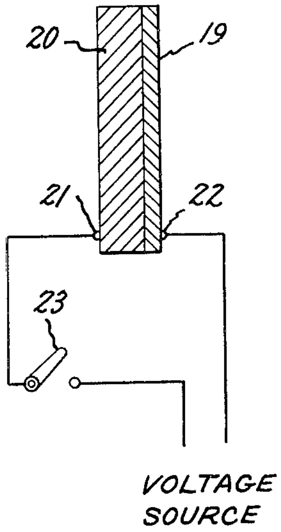
FIGURE 2 is an illustration of an electroluminescent cell constructed in accordance with the present invention.

In further accord with the present invention, FIGURE 2 illustrates an electroluminescent cell which comprises a layer 19 of intrinsic cadmium fluoride impregnated with an activator such as manganese and a layer 20 of n-type cadmium fluoride impregnated with yttrium. The manganese or other activator must be present in an amount effective to produce electroluminescence, that is, approximately between .01 mole percent and 1 mole percent and the yttrium must be present in an amount effective to render the crystal semiconductive, that is, between a small but finite amount and 10 mole percent. A pair of indium electrodes 21 and 22, attached, for example, by means of indium solder to the respective layers, are connected in series with a switch 23 and an appropriate source of voltage pulses. It is noted that, because the intrinsic layer is highly insulating, it must be extremely thin, for example, on the order of one-half millimeter. In the operation of such a cell, a voltage pulse of between approximately 100 and 1000 volts is applied for a period of, for example, 0.1 second and electroluminescence is observed.

A possible explanation of this electroluminescence is that the loosely bound electrons from the n-type layer are driven by the voltage into the intrinsic layer where they strike the manganese ions and excite them. Later relaxation of the manganese ions produces a light output. Again, however, it is noted that the present invention is not limited to the precise theory presented but rather is directed to the claimed material, articles and process.

To prepare the electroluminescent cell illustrated in FIGURE 2, the intrinsic layer 19 is first grown in apparatus of the type shown in FIGURE 1 from a powder containing cadmium fluoride and an amount of manganese fluoride sufficient to provide manganese in the crystal in an amount ranging between approximately 0.01 mole percent and approximately 1 mole percent by melting and crystallizing the powder in an inert or vacuum atmosphere. The apparatus used may be that shown in FIGURE 1. The semiconductive layer is grown thereon by placing a powder comprising cadmium fluoride and yttrium fluoride sufficient to provide an yttrium concentration in the crystal ranging from a small but finite quantity up to a maximum of approximately 10 mole percent on the surface of the intrinsic layer, melting the powder and a small portion of the surface of the intrinsic crystal and then proceeding to withdraw the crucible from the heating means as previously described so as to grow the n-type layer as a continuous part of the same crystal. The two-layer crystal is then placed in an enclosure with sufficient cadmium metal to provide a saturated atmosphere and heated as previously described so as to convert the $CdF_2$:Y portion of the crystal into an n-type semiconductor.

Finally, the single crystal is reduced in size by means of cutting, grinding and polishing to form any appropriate shape and to reduce the intrinsic layer to the desired width of approximately one-half millimeter.

Indium electrodes 24 and 25 are then attached to the respective layers and the resultant cell is placed in series with a source of appropriate voltage and an appropriate switching means 26. The thickness of the n-type layer is not of critical importance since this layer is sufficiently conductive to allow passage of current.

Figure 3:
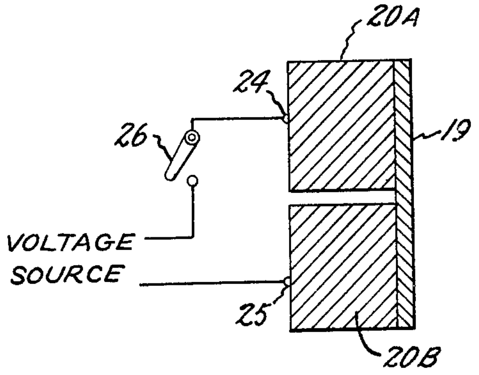
FIGURE 3 is an alternative embodiment of an electroluminescent cell constructed in accordance with the present invention.

An alternative embodiment of an electroluminescent cell in accordance with the present invention is illustrated in FIGURE 3 wherein the crystal is similar to that shown in FIGURE 2 except that the n-type layer 20 has now been divided, for example, by cutting, into two portions 20A and 20B. In this embodiment, the indium electrodes 11 and 12 are attached respectively to each of the portions of the n-type layer so that the current flow is from one n-type portion through the intrinsic layer into the other n-type portion. Electroluminescence has again been found to occur upon application of a similar voltage pulse.

In the embodiment illustrated in FIGURE 3, electrons are injected from the n-type portion adjacent the negative electrode and excite the activator in the same manner as previously described. The use of two portions of the n-type layer as separate electrode contacts overcomes the difficulty of attaching electrodes directly to the thin intrinsic layer, and is much more readily accomplished than growing a second n-type layer on the opposite surface of the thin intrinsic crystal layer.

In any embodiment, electroluminescence occurs when a voltage pulse is applied across a two-layer crystal of $CdF_2$:Mn, Y wherein the two layers are respectively intrinsic and n-type semiconductive. The particular advantage of this crystal as an electroluminescent device arises from the fact that cadmium fluoride has a band gap large in comparison to that of previous electroluminescent materials. Specifically, the band gap of $CdF_2$ is six electron volts where previous electroluminescent materials have band gaps of approximately two to four electron volts. This small band gap has allowed photons of an energy corresponding to the band gap energy or larger to be absorbed without leaving the crystal. In $CdF_2$:Mn, Y, photons having energies as large as six electron volts cannot be absorbed and so are emitted and the crystal can be luminescent in the visible or ultraviolet spectrum.

The following specific examples of the practice of the present invention are set forth for purposes of explanation only and are not to be construed in a limiting sense.

EXAMPLE I

A charge of powder comprising cadmium fluoride and 0.1 mole percent yttrium fluoride was placed in a graphite crucible of the type illustrated in FIGURE 1 and heated to approximately 1100° C. until the powder was completely molten. The RF coil was then raised to effect removal of the crucible therefrom and a crystal was formed as the material cooled. A portion of the resultant crystal, cut to a size of one cubic centimeter, was maintained in a saturated cadmium metal vapor atmosphere at a temperature of 500° C. for approximately 5 minutes until the crystal was colored uniformly blue. The crystal then exhibited a resistivity of 0.2 ohm-centimeter, a Hall mobility of 4 $cm.^2$/volt sec. and the number of carriers was determined to be $6\times10^{18}$ electrons per cubic centimeter.

EXAMPLE II

A charge of powder comprising cadmium fluoride and 0.1 mole percent manganese fluoride was placed in a graphite crucible of the type described above and heated to approximately 1100° C. until the powder was completely molten. The RF coil was then raised from the crucible and a crystal formed as the material cooled. A second charge of powder comprising cadmium fluoride and 0.1 mole percent yttrium fluoride was placed in the crucible on top of the previously grown crystal. The crucible was then placed in the RF coil in such a way that only the uppermost portion of the previously grown crystal was remolten along with the powder. The RF coil was then raised from the crucible so that the composite charge formed a single cadmium fluoride crystal, the lower portion of which contained only manganese and no yttrium. The crystal was heated in Cd vapor at 500° C. making the portion containing the yttrium semiconducting and coloring it blue.

Nearly all of the portion of the crystal which contained only manganese (the insulating portion) was cut away, leaving an insulating layer less than 1 mm. thick. Electrodes were then attached with cadmium-mercury solder. The resulting structure had a lower resistance when the electrode which was attached to the colored region was negative rather than positive relative to the electrode on the colorless region. When either alternating or direct voltages were applied to the crystal a green electroluminescence was observed coming from the colorless region. A faint emission was observed with a D.C. voltage connected with a polarity corresponding to the lower resistance and a much more intense transient emission occurred when the polarity was subsequently reversed.

EXAMPLE III

A charge of powder comprising cadmium fluoride and 0.3 mole percent manganese fluoride was placed in a graphite crucible of the type described above and heated to approximately 1100° C. until the powder was completely molten. The crucible was then withdrawn from the RF coil and a crystal formed as the material cooled. A second charge of powder comprising cadmium fluoride and 0.1 mole percent yttrium fluoride was placed in the crucible on top of the previously grown crystal. The crucible was then placed in the RF coil in such a way that only the uppermost portion of the previously grown crystal was remolten along with the powder. The crucible was then lowered out of the RF coil so that the composite charge formed a single cadmium fluoride crystal, the lower portion of which contained only manganese and no yttrium. The crystal was then heated in Cd vapor at 500° C. making the portion containing the yttrium semiconducting and coloring it blue.

The colored (conducting) region was then cut with a diamond saw, dividing it into two separate parts. The saw cut was perpendicular to the plane of the junction between the semiconducting and insulating regions. It was approximately 0.015" wide and it extended into the insulating region approximately 0.010".

Electrodes were attached to each of the two separate colored regions with indium solder. D.C. voltage pulses of a magnitude of 765 volts and a duration of 1 sec. were applied to the sample and a green electroluminescence was observed to emanate from the colorless region, predominately near that electrode which was positive. The magnitude of the light intensity was measured with a 1P21 photomultiplier and by assuming an isotropic distribution of the emitted light a power efficiency of 1.8% was calculated from the magnitude of the photocurrent.

From the foregoing it may readily be seen that the present invention is directed to the preparation of cadmium fluoride impregnated with yttrium and having semiconductive properties and to the making of an electroluminescent cell thereof. It is also noted that other equivalent devices which incorporate the principle of accelerating electrons from semiconductive cadmium fluoride containing yttrium into a region of insulating cadmium fluoride containing an activator by means of a high electric field are intended to be included in this invention. For example, both yttrium and the activator may be in the same overall region of a device and emission is obtained by producing an electrical field in a more limited region thereof. While the invention has been set forth herein with respect to certain embodiments and specific examples thereof, many modifications and changes will readily occur to those skilled in the art. Accordingly, we intend by the appended claims, to cover all such modifications and changes as may fall within the true spirit and scope of this invention.

What we claim as new and desire to secure by Letters Patent of the United States is:

1. An electroluminescent cell comprising a crystal having a plurality of different characteristic regions, a first of said regions comprising insulating cadmium fluoride containing a manganese activator therefor and a second of said regions comprising a semiconductive layer comprising a single crystal of cadmium fluoride containing yttrium in an amount ranging from a small but finite quantity up to a maximum of approximately 10 mole percent and having a fluoride ion depletion.

2. The electroluminescent cell claimed in claim 1 wherein said first region comprises a layer of intrinsic cadmium fluoride containing a manganese activator.

3. An electroluminescent cell as claimed in claim 1 wherein said second layer has a resistivity ranging approximately between 0.01 ohm-cm. and 10 ohm-cm. and a Hall mobility ranging approximately between 1 $cm.^2$/volt/sec. and 20 $cm.^2$/volt/sec.

4. An electroluminescent cell as claimed in claim 2 wherein said second layer is divided into two spaced portions.

References Cited

UNITED STATES PATENTS

| | | | |
|---|---|---|---|
| 3,305,486 | 2/1967 | Prener et al. | 252—62.3 |
| 3,413,507 | 11/1968 | Itoh et al. | 252—62.3 |

L. DEWAYNE RUTLEDGE, Primary Examiner

R. A. LESTER, Assistant Examiner

U.S. Cl. X.R.

252—62.3; 313—108; 317—234, 235, 237